Dec. 30, 1958   R. W. TRIPP   2,866,597
BILATERAL ELECTRICAL RESOLVER SYSTEM
Filed July 3, 1956   8 Sheets-Sheet 1
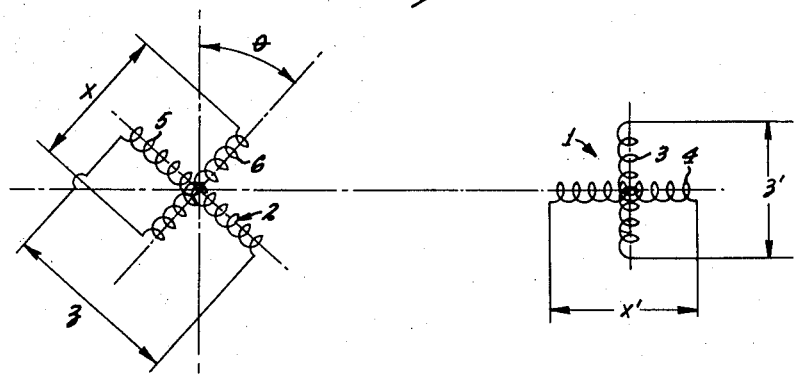
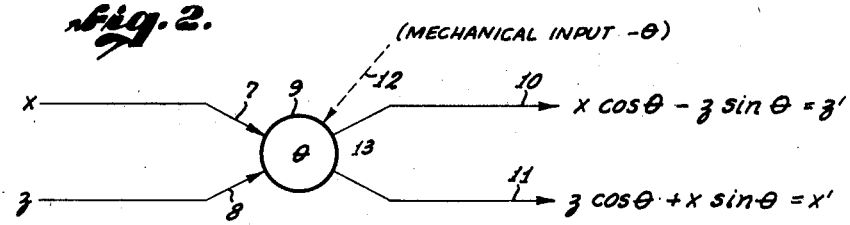
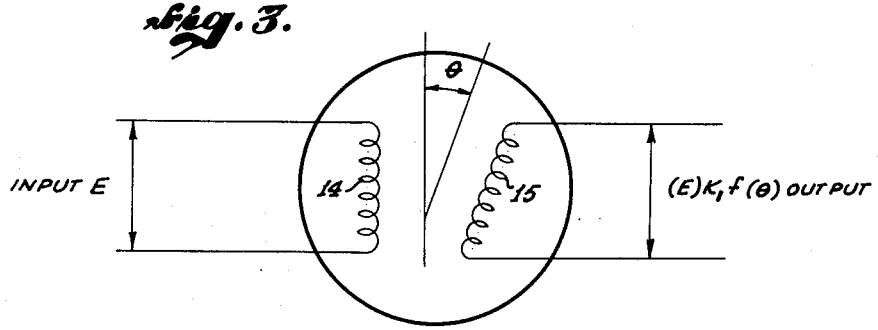
ROBERT W. TRIPP,
INVENTOR.
BY *W E Beatty*
ATTORNEY.

Dec. 30, 1958   R. W. TRIPP   2,866,597
BILATERAL ELECTRICAL RESOLVER SYSTEM
Filed July 3, 1956   8 Sheets-Sheet 2

ROBERT W. TRIPP,
INVENTOR.

BY W. E. Beatty

ATTORNEY.

Dec. 30, 1958    R. W. TRIPP    2,866,597
BILATERAL ELECTRICAL RESOLVER SYSTEM
Filed July 3, 1956    8 Sheets-Sheet 4
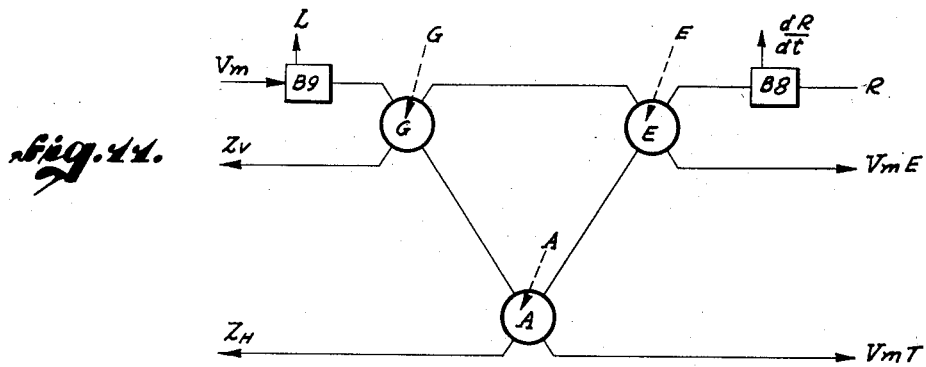
Fig. 11.
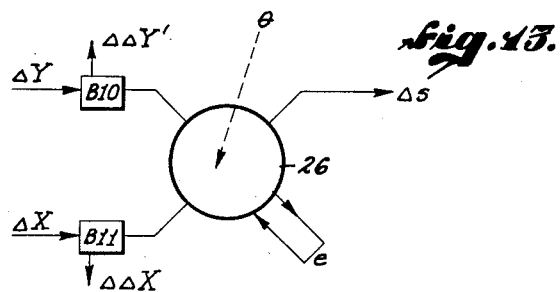
Fig. 13.
Fig. 14.
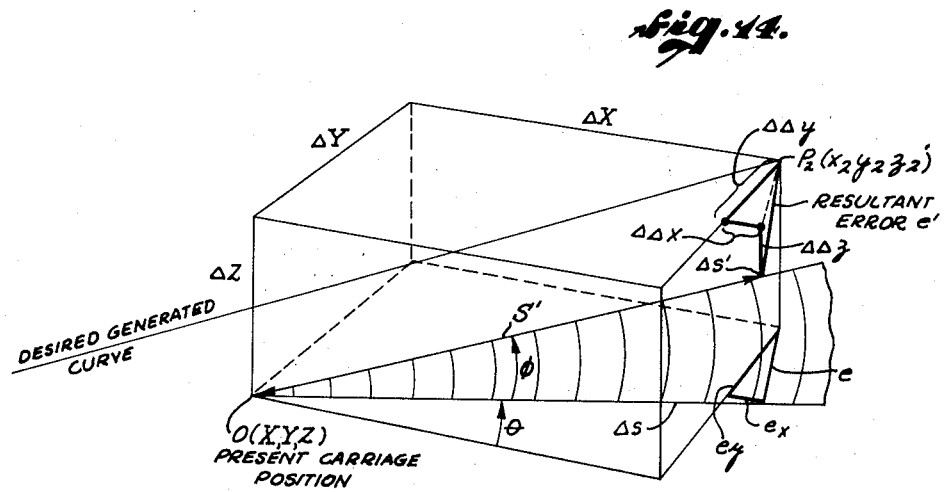
ROBERT W. TRIPP,
INVENTOR.
BY W. E. Beatty
ATTORNEY.

Dec. 30, 1958 R. W. TRIPP 2,866,597
BILATERAL ELECTRICAL RESOLVER SYSTEM
Filed July 3, 1956 8 Sheets-Sheet 5

ROBERT W. TRIPP,
INVENTOR.

BY W E Beatty

ATTORNEY.

Dec. 30, 1958  R. W. TRIPP  2,866,597
BILATERAL ELECTRICAL RESOLVER SYSTEM
Filed July 3, 1956  8 Sheets-Sheet 6

ROBERT W. TRIPP,
INVENTOR.

BY W E Beatty

ATTORNEY.

Dec. 30, 1958  R. W. TRIPP  2,866,597
BILATERAL ELECTRICAL RESOLVER SYSTEM
Filed July 3, 1956  8 Sheets-Sheet 7

ROBERT W. TRIPP,
INVENTOR.

BY W E Beatty

ATTORNEY.

Dec. 30, 1958  R. W. TRIPP  2,866,597
BILATERAL ELECTRICAL RESOLVER SYSTEM
Filed July 3, 1956  8 Sheets-Sheet 8

ROBERT W. TRIPP,
INVENTOR.

BY W E Beatty

ATTORNEY.

United States Patent Office 2,866,597
Patented Dec. 30, 1958

2,866,597

BILATERAL ELECTRICAL RESOLVER SYSTEM

Robert W. Tripp, Bronxville, N. Y., assignor, by mesne assignments, to Inductosyn Corporation, Carson City, Nev., a corporation of Nevada Application July 3, 1956, Serial No. 595,702

9 Claims. (Cl. 235—61)

The invention relates to a bi-lateral electrical resolver system and more particularly to electrical resolver systems which are adapted to transmit information simultaneously in opposite directions. The rotation of coordinates, solution of triangles for angles or sides, addition of angles, transfer between rectangular and colar coordinates and the resolution composition or addition of vectors, are typical problems handled by resolvers. Some of these problems are dealt with pages 158 to 171 of vol. 21, "Electronic Instruments," by Greenwood et al., Radiation Lab. Series, published 1948 by McGraw-Hill Book Co., Inc.

The problems handled by resolvers usually require the use of a substantial number of resolvers and it is an object of the present invention to reduce the number of resolvers required.

The conventional use of a resolver allows the transmission of information only from one direction at any one time. The present invention provides for the transmission of information in opposite directions or in both directions simultaneously, thereby reducing the number of resolvers required.

Generally speaking, the object of the invention is accomplished by using a resolver winding as an arm of a balanced bridge. This winding receives current by division of an input applied to the bridge, the other resolver winding serving as an output, with no potential difference across intermediate terminals of the bridge for transmission in one direction. A second and separate input is applied to the other resolver winding and for which the bridge terminals serve as an output, for transmission in the opposite direction.

The invention provides a further simplification in the case where the second and separate input is a single component in a second coordinate system, the problem being to resolve this component into its respective components in the first coordinate system. According to a further feature of the invention, the second input, this is, the component in the second coordinate system is reflected back through the resolver by short circuiting its winding, it having been determined by trial that this serves the purpose whereby for transmission in one direction the resolver resolves an input into a component, the short circuit winding reflecting this component back through the resolver where its components in the first coordinate system are available at bridge terminals as above described.

Various modifications are illustrated. For example, the bridge may be in circuit with each winding of a two-winding resolver, or the invention may be applied to a four-winding resolver and also to resolvers in cascade, special applications being illustrated for transformation of coordinates in a guided missile control system and for the 2-dimensional or 3-dimensional computation of errors in a machine tool control system. The machine tool control system is described and claimed in application S. N. 563,125, filed February 2, 1956, for "Automatic Digital Machine Tool Control" and assigned to the assignee of the present application.

For further details of the invention reference may be made to the drawings wherein Fig. 1 is a schematic view of a conventional four-winding resolver.

Fig. 2 is a schematic view of a simplified showing for the four-winding resolver of Fig. 1.

Fig. 3 is a schematic view of a conventional two-winding resolver.

Fig. 12 is a schematic showing of the use of resolvers in tandem for computing the error components in a machine tool control system and is described and claimed in further detail in the above mentioned patent application S. N. 563,125, the two resolvers in Fig. 12 being replaced by a single resolver according to the present invention as illustrated in the schematic circuit of Fig. 13.

Figure 21:
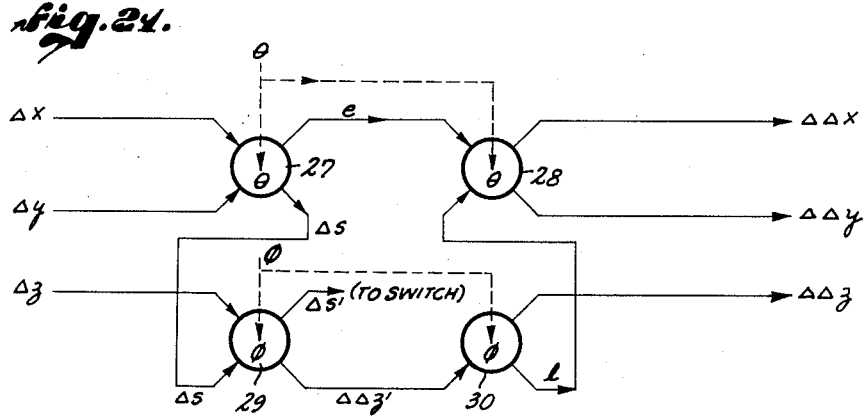
Figure 22:
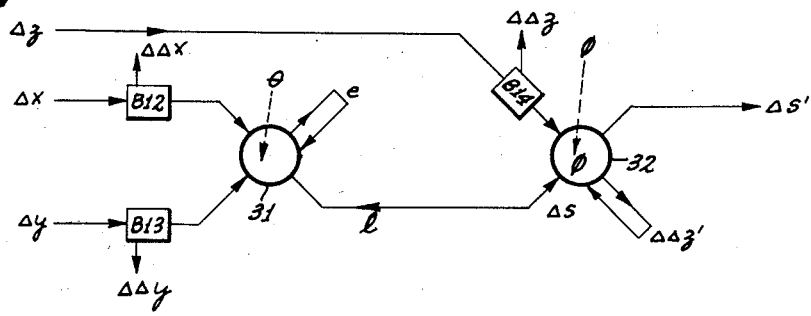
Figure 23:
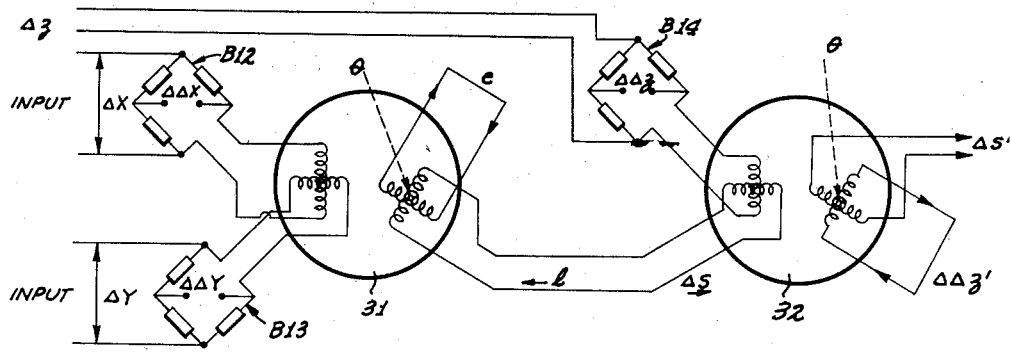

Fig. 14 is a perspective view and illustrates the computation of the error of the tool or carriage position in the 3-dimensional case and for which four resolvers may be employed as described in connection with schematic showings in Figs. 17 to 23, the reduction from four to two of the number of resolvers required according to the present invention being illustrated in the schematic circuit of Fig. 22, shown in detail in Fig. 23.

Figure 15:
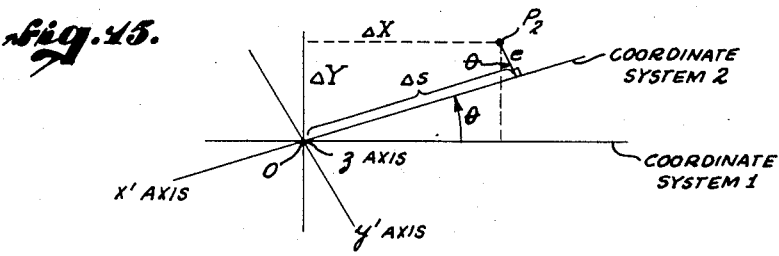
Figure 16:
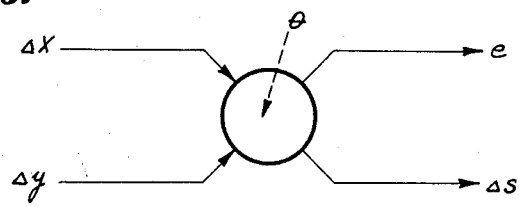
Figure 24:
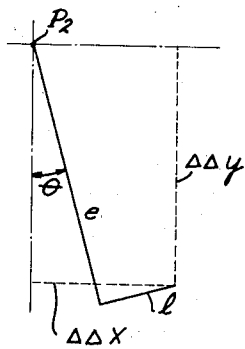

Figs. 15, 16 and 24 are schematic views useful in connection with Figs. 12 and 14.

Referring in detail to the drawings, Fig. 1 illustrates a conventional resolver having a stator 1 and rotor 2, the angular position of the rotor being indicated by the angle $\theta$. The stator 1 has a pair of crossed windings indicated at 3 and 4 and the rotor has a pair of crossed windings at 5 and 6, each pair being wound in space quadrature. As well known, if the inputs $x$ and $z$ are applied to the rotor windings as shown, the outputs $x'$ and $z'$ at windings 3 and 4 will be as indicated in Fig. 1.

In order to simplify the drawings, a convenient symbolism or schematic showing has been established for the conventional resolver of Fig. 1 and this is illustrated in Fig. 2, wherein the pair of wires for each winding are now represented by a single line, the inputs being represented by appropriate characters such as $x$ and $z$, as shown, and with arrowheads 7 and 8 directed inwardly to the circle 9 while the outputs are represented by two other lines having arrowheads 10 and 11 directed outwardly from circle 9, the broken line 12 and the angle such as $\theta$ indicated at 13 representing the angular position of the rotor with respect to the stator. The output from arrowhead 10 is represented as equal to "$z'$," while the other ouput in Fig. 2 is represented as equal to "$x'$." This is for purpose of simplification in connection with a later description and in connection with certain other figures such as Fig. 7 having a similar value of output.

Basically a resolver is a two winding transformer whose transformation ratio is variable as the function of the angle between the two windings.

As can be seen in Fig. 3, if an input of E volts is impressed across winding 14, there will be an output on winding 15 of value $$EK_1 f(\theta) \qquad \text{Eq. 1}$$

where:

$K_1$ is a constant, taking into effect turns ratio leakage, etc.
$f(\theta)$ is a function of the angle $\theta$
E is the impressed voltage The conventional use of a resolver can only allow information from one direction at any one time.

According to the present invention, a resolver or similar inductively coupled linear device can use information in both directions simultaneously.

Figure 4:
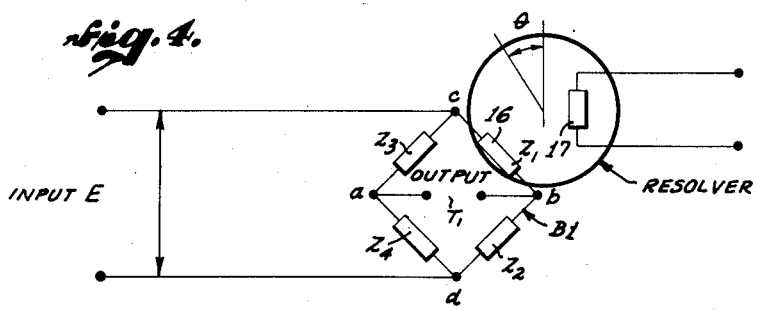
Fig. 4 is a schematic view of the bridge of the present invention in one input of a two-winding resolver.

As shown in Fig. 4, the resolver winding 16 is a complex impedance which can be placed in one arm of a balanced bridge B1.

The bridge B1 has two branches $c, a, d$ and $c, b, d$ in parallel to which the input E is applied. The impedances $Z_1$ to $Z_4$ are balanced with no potential drop across the terminals T1 when input E is applied as shown. If there is an input E at points $c$ and $d$ of the bridge, and if $$\frac{Z_1}{Z_0} = \frac{Z_3}{Z_4}$$

Then there will be zero output across $a$ and $b$, or terminals T1.

However, there is an impressed voltage of $$\frac{Z_1(E)}{Z_1 + Z_2} \qquad \text{Eq. 2}$$

across the resolver winding 16 due to voltage division and there will be an output of $$\frac{Z_1}{Z_1 + Z_2} K_1 f(\theta) E \qquad \text{Eq. 3}$$

From Eq. 1 and 2 at winding 17.

If there is no input E, and an input V is placed across winding 17, then appearing across winding 16 is the voltage $K_1 f(\theta) V$, and across $a$ and $b$, due to voltage division is:

$$\frac{Z_2 + Z_4}{Z_1 + Z_2 + Z_3 + Z_4} K_1 f(\theta) V \qquad \text{Eq. 4}$$

Figure 5:
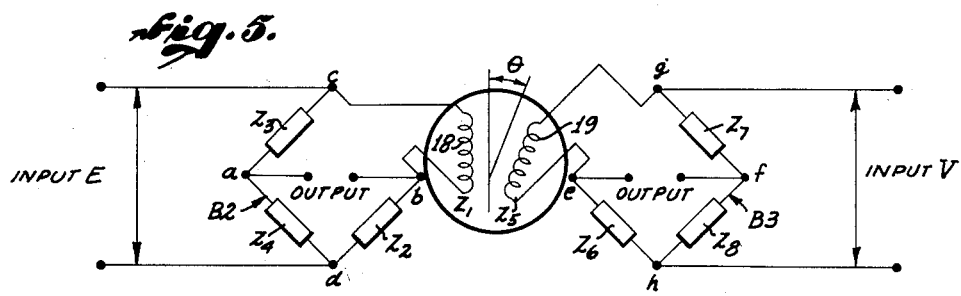
Fig. 5 is a schematic view of a bridge of the present invention and an input for each winding of a two-winding resolver.

Then by superposition, voltages can be applied to both sides of the resolver, as shown in Fig. 5.

Referring to Fig. 5, $Z_1$ is the impedance of resolver winding 18
$Z_2 + Z_3 + Z_4$ is the sum of the arm impedances of bridge B2
$Z_5$ is the impedance of resolver winding 19
$Z_6 + Z_7 + Z_8$ is the sum of the arm impedances of bridge B3
$K_1$ is a constant of voltage transformation across windings 18 and 19
$f(\theta)$ is the function of the angle between windings 18 and 19
E is the voltage input to bridge B2 coming from a source of zero impedance
V is the voltage input to bridge B3 coming from a source of zero impedance
($a$ and $b$) are output terminals of bridge B2
($c$ and $d$) are input terminals of bridge B2
($e$ and $f$) are output terminals of bridge B3
($g$ and $h$) are input terminals of bridge B3

Bridge B2

Input across ($c$ and $d$) is E volts
Output across ($a$ and $b$) due to E is 0 volts
Voltage appearing across $Z_1$ due to E is:

$$\frac{Z_1}{Z_0 + Z_6} E \qquad \text{from Eq. 2}$$

Voltage appearing across $Z_5$ (winding 19) due to E is:

$$\frac{Z_1}{Z_1 + Z_2} E K_1 f(\theta) \qquad \text{from Eq. 3}$$

Voltage appearing across ($e$ and $f$) due to E is:

$$\frac{Z_6 + Z_8}{Z_5 + Z_6 + Z_7 + Z_8} \frac{Z_1}{Z_1 + Z_2} E K_1 f(\theta)$$

from Eq. 4

Assume the above equation in parentheses times $K_1$ is now called a new constant $K_2$.

Then, across ($e$ and $f$) the voltage due to E is $K_2 E f(\theta)$

Bridge B3

Input across ($g$ and $h$) is V volts
Output across ($e$ and $f$) due to V is 0 volts Similar to the case of bridge B2, the output appearing across ($a$ and $b$) is:

$$\frac{Z_2 + Z_4}{Z_1 + Z_2 + Z_3 + Z_4} \frac{Z_5}{Z_5 + Z_6} K_1 V f(\theta)$$

and converting to a new constant $K_3$, the voltage due to V is $K_3 V f(\theta)$ This it has been shown that with an input of E volts on bridge B2, and an input of V volts on bridge B3, a simultaneous output of $K_3 V f(\theta)$ at bridge B2 and $K_2 E f(\theta)$ at bridge B3 can be obtained. One pair of resolver windings can be used to feed information in both directions at the same time. This bridge method can be used, no matter how many sets of windings there are on the resolver, or how many resolvers there are cascaded.

Figure 6:
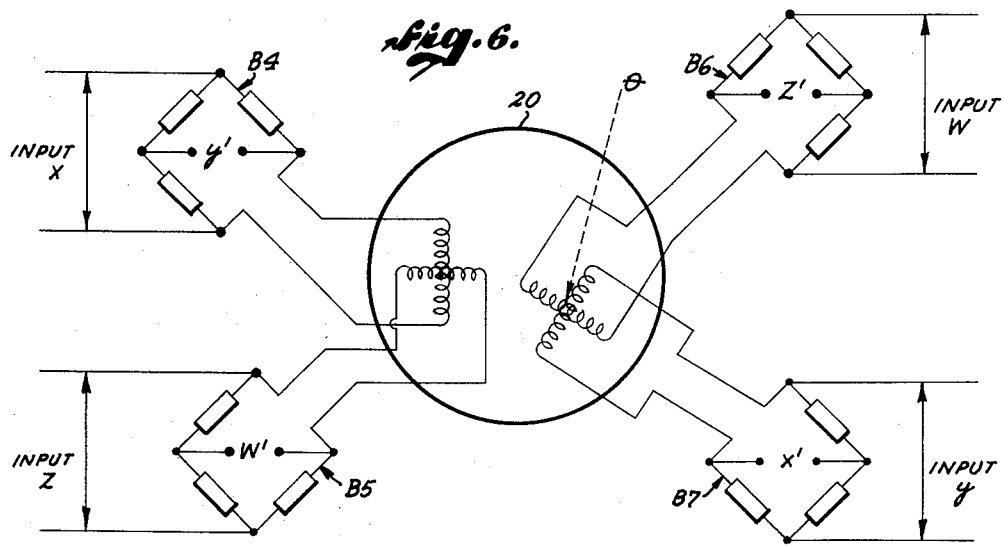
Fig. 6 is a schematic view of an input and bridge for each winding of a four-winding resolver.
Figure 7:
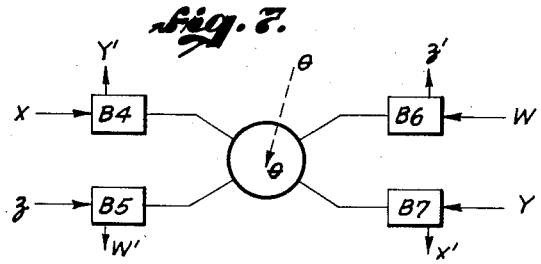
Fig. 7 illustrates in simplified form the resolver system of Fig. 6.
Figure 8:
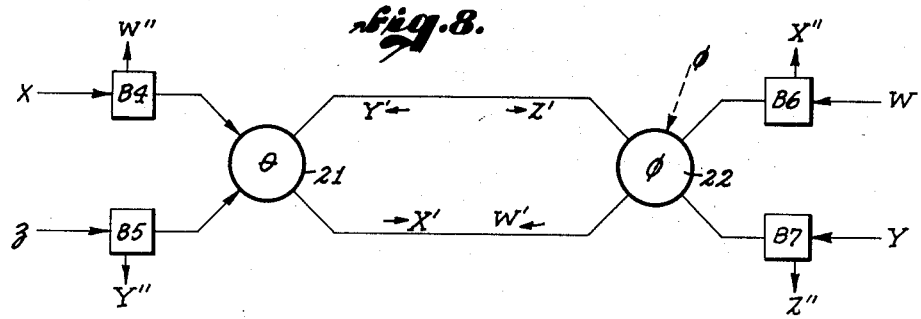
Fig. 8 is a schematic showing of the invention as applied to resolvers in tandem with an input and bridge for each of two windings for each of the resolvers.

The preceding discussion has centered about resolvers which have two windings. Bi-lateral operation can be applied as well to a three or four winding resolver. Fig. 2 illustrates the inputs and outputs of a four winding resolver operated unilaterally. Fig. 6 illustrates a four winding resolver 20 with bridges B4 to B7 on each leg respectively. This arrangement can be used for bi-lateral operation. The basis for this statement is the fact that a resolver is a linear device, subject therefore to the principle of superposition of voltages, and that voltage applied to a primary winding should induce no voltage in the other (90-degree) primary winding. Working from left to right; inputs X and Z in Fig. 6 result in outputs $X^1$ and $Z^1$. It is seen that this is identical to the operation shown in Fig. 2. Similarly, working in the opposite direction from right to left, inputs $w$ and $y$ result in outputs $w^1$ and $y^1$. For convenience, the bridges B4 to B7 of Fig. 6 can be represented by a single block as shown in Fig. 7. Bridges B4 to B7 have impedances in balanced relation as described in connection with Figs. 4 and 5. Fig. 8 illustrates the cascading of two resolvers for a bi-lateral operation. The example chosen is for the transformation of coordinates when the coordinate system has been rotated through the sum of the angles $\theta$ and $\phi$. The inputs $x$ and $z$ produce outputs $x'$ and $z'$ at the output of resolver 21, Fig. 8, in a direction to the right and of values shown in Fig. 2, while the values $x'$ and $z'$ in turn produce outputs $x''$ and $z''$ at the terminals of bridges B6 and B7, the values of $x''$ and $z''$ being a function of the angle $\phi$ of resolver 22 as well as the function of angle $\theta$ of resolver 21. For similar reasons, the inputs W and Y, for transmission in the opposite direction, produce outputs $W''$ and $Y''$ at the bridges B4 and B5 respectively, as a function of both the angle $\phi$ and the angle $\theta$.

Figure 9:
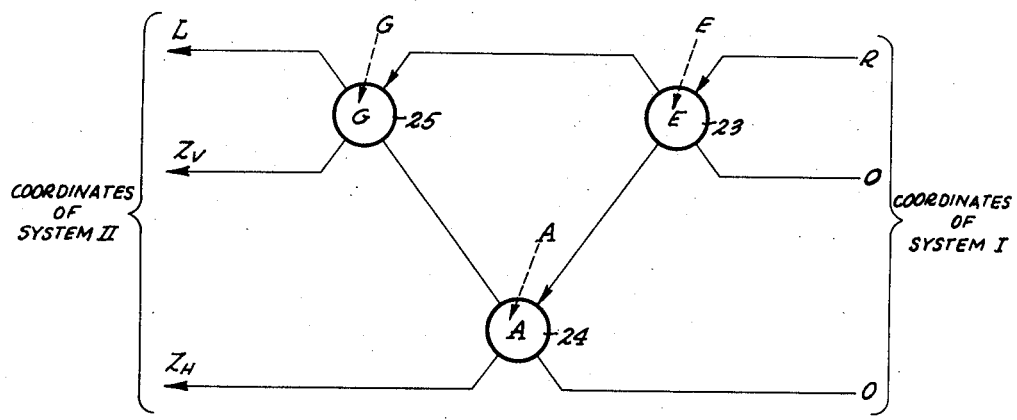
Figs. 9 and 10 are schematic showings of the conventional uses of resolvers for transforming coordinates and velocity vectors, requiring six resolvers, for which only three are required according to the present invention as illustrated schematically in Fig. 11.

An example of bi-lateral resolver application can be chosen from a real solution of a guided missile problem. To avoid confusing this discussion with the complications of the problem, the part of the computer that involves bi-lateral operation only, will be discussed. Two basic sets of computations are required. One deals with position coordinates and the other with velocity vectors. The first of these calls for the transformation of position coordinates from a Cartesian coordinates system I, to a coordinate system II, the latter system having been rotated (with respect to system I) through three successive rotations about mutually perpendicular axes. Specifically, the coordinates in system I from an observing station O (origin of coordinates) to a missile M, are R, O, O, as indicated in Fig. 9, where R is the range from observing station to missile. The problem is to find the three coordinates from O to M in the coordinate system II that has been successively rotated through the angles E, A, G. This can be done using a conventional unilateral arrangement of three resolvers, 23, 24 and 25, see Fig. 9.

Figure 10:
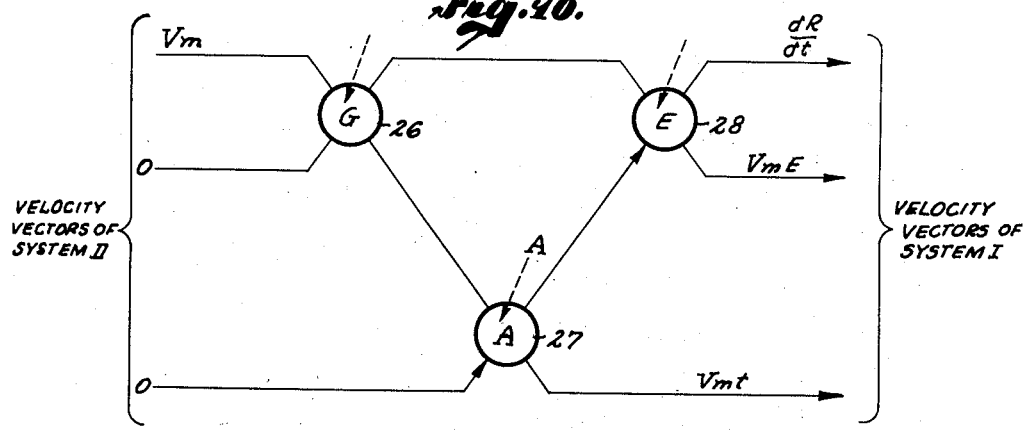
Figure 42:
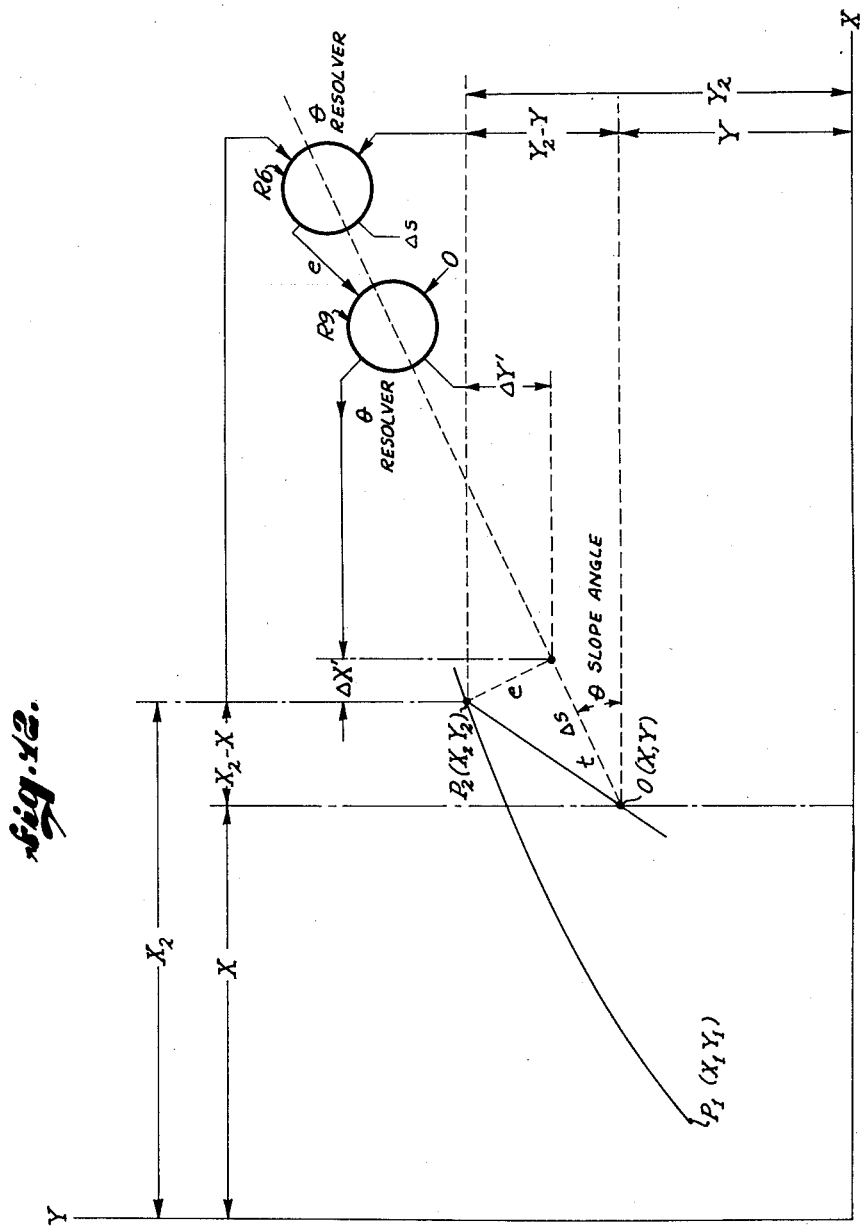

The second set of computations deals with the transformation of velocity vectors from one coordinate system to another. In this case, however, the transformation is from coordinate system II to system I. The velocity vectors in system II are V$m$, O, O as indicated in Fig. 10, where V$m$ is the missile velocity. The problem is to find the three equivalent velocity vectors in coordinate system I that has been successively rotated (with respect to system II) through the angles G, A, E. This can be accomplished using a conventional unilateral arrangement of three resolvers, 26, 27 and 28, Fig. 10. Fig. 10 shows as one of the outputs, the vector $$\frac{dR}{dt}$$

This is the rate of change of range between the observing station and the missile, and is one of the velocity vectors of system I, since the line of sight between O and M is one of the axes of coordinate system I.

By comparing Figs. 9 and 10, it can be seen that due to the symmetry, bi-lateral application can be applied, and Fig. 11 illustrates this application. Note that since two inputs in both Figs. 9 and 10 are always zero, it is not necessary to use bridges at these points in the bi-lateral arrangement. Referring to Fig. 11, the value $$\frac{dR}{dt}$$

is available at the terminals of bridge B8, and position coordinate L is available at the terminals of bridge B9. For practical reasons a constant value can be substituted for the range R. The value R can be applied beyond the resolvers, to bring the geometry to its correct scale.

A description will now be given of the use of the bi-lateral principle in determining the machining errors of a machine tool control system. The two dimensional case is first discussed, using resolvers in the usual unilateral manner, as described and claimed in application S. N. 563,125 referred to above. The bi-lateral application is then discussed, again from the point of view of unilateral and bilateral methods. Referring to Fig. 12, $P_1(X_1Y_1)$ and $P_2(X_2Y_2)$ are two successive check points on the curve to be generated. The data $X_1Y_1$ and $X_2Y_2$ are obtained from the card or tape record of values supplied to the digital to analogue computer which computes values appropriate to the tool path, as described and claimed in S. N. 563,125. $\Delta X(X_2-X)$ and $\Delta Y(Y_2-Y)$ in Fig. 12 are the differences between $X_2Y_2$ (from input card or tape) and present machine carriage position $O(X, Y)$.

Using an initial starting point $P_1(X_1Y_1)$ and continuous curve slope rate data $$\frac{d\theta}{dt}$$

we can obtain by way of a mechanical resolver the $$\frac{dX}{dt}$$

and $$\frac{dY}{dt}$$

By integrating these rates and adding the initial coordinates $X_1$, $Y_1$, we then have X and Y, or the present machine carriage position.

$\Delta X$ and $\Delta Y$ are constantly obtained and fed into a resolver R6 in the manner shown in Fig. 12. Resolvers R6 and R9 are set at the angle $\theta$. Resolver R6 has an output $e$ which is an input to resolver R9 and the latter has as outputs $\Delta X'$ and $\Delta Y'$ which are the correction values.

The correction values $\Delta X'$ and $\Delta Y'$ are obtained. When the distance $\Delta S$ has decreased to a certain preselected value (a small fraction of the distance between points $P_1$ and $P_2$) a switch closes which allows the correction to start. The correction values are differentially added to the computed X and Y values. The vector sum of these values are used to drive the carriage of the machine. When the carriage position (or tool position) has been brought back to the required curve, the values $\Delta X'$ and $\Delta Y'$ will have become zero. The distance between $P_1$ and $P_2$ is limited to a value whereby the machine and computer combination will not be in error ($\Delta y'$ and $\Delta x'$) by values that exceed the allowable machining tolerances.

The principles of bi-lateral resolver application discussed earlier, can be used to eliminate one resolver of Fig. 12. In Fig. 13, the bridges B10 and B11 represent bridges previously described for bi-lateral application of resolver 26. Each bridge B10 and B11 consists of three impedance legs, the resolver winding acting as the fourth leg, as previously described.

The resolver output $e$ is short circuited, resulting in a reflected voltage $e$ applied as an input to resolver 26. This voltage $e$ is applied back to the resolver 26 and is then resolved into $\Delta X'$ and $\Delta Y'$, the desired coordinate errors, which are available at the terminals of the bridges B10 and B11. Thus the coordinates $\Delta X$ and $\Delta Y$ of a signal in coordinate system I are resolved into a component $e$ in coordinate system II (at angle $\theta$), and component $e$ is resolved into its components $\Delta X'$ and $\Delta Y'$ in coordinate system I.

The foregoing has described the method of obtaining the machine tool errors in the coordinates X and Y for a two dimensional operation. This can be extended to the three dimensional case. Fig. 14 illustrates the problem. Point O is the present position of the machine carriage. Its coordinates are X, Y, Z. This point is equivalent to point O for the two dimensional case of Fig. 12. The direction of the curve is defined by the general angles $\theta$ and $\phi$ which are the direction angles of the tangent to any point of the curve. As in Fig. 12 for the two dimensional case, the vector S' is parallel to the desired generated curve. The carriage position (point O) is displaced from where it should be by the three coordinates $\Delta\Delta X$, $\Delta\Delta Y$, $\Delta\Delta Z$. These are the errors to be found and corrected for. The net resultant of these three mutually perpendicular errors is shown as $e'$. It is the shortest distance from point $P_2$ to the line extending from point O at the angles $\theta$ and $\phi$. More specifically the vector $e'$ is the miss distance from the point $P_2$ if the carriage continued to travel without correction, along its present path defined by the angles $\theta$ and $\phi$. When the coordinate errors $\Delta\Delta X$, $\Delta\Delta Y$, $\Delta\Delta Z$ have been found, the carriage position can then be corrected as it approaches the point $P_2$. These errors will be obtained in the following analysis:

Project a plan view (X, Y, plane) of Fig. 14.

The coordinates $\Delta X$, $\Delta Y$ are measured in coordinate system 1 (see Fig. 15). Rotate this system about the $z$ axis through the angle $\theta$. The new coordinates of the point $P_2$ in this new rotated system are $\Delta S$ and $e$. These can be obtained with a resolver (see Fig. 16).

Now looking into the $y'$ axis, it is seen that the point $P_2$ is represented by the coordinates $\Delta z$ and $\Delta S$ with respect to coordinate system 2.

Figure 17:
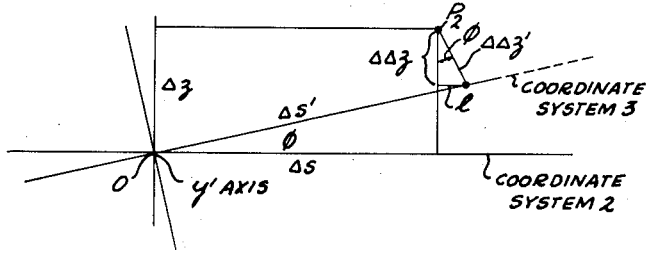
Figure 18:
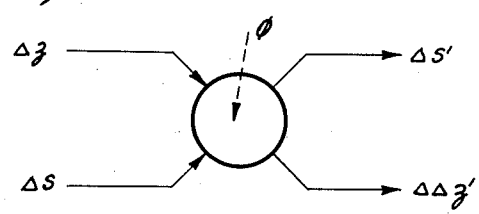

Rotating this system through the angle $\phi$ results in coordinate system 3 (see Fig. 17). The point $P_2$ in this system is represented by the coordinates $\Delta\Delta z'$ and $\Delta S'$. The coordinate $\Delta S'$ is the vector shown in Fig. 14. The solution for these coordinates can be accomplished as shown in Fig. 18. The vector $\Delta\Delta z'$ has components in all three mutually perpendicular directions of the original system X, Y, Z of Fig. 14. The value $\Delta\Delta z$ of Fig. 17 is one of the three error values to be found. It can be seen as a component of $\Delta\Delta z'$. The other component of $\Delta\Delta z'$ in Fig. 17 is in the X, Y, plane and is shown in the figure as the vector $l$. This vector is in the plane of Fig. 15 and is perpendicular to the vector $e$.

Figure 19:
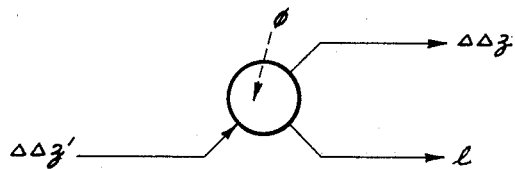

The coordinates $\Delta\Delta z$ and $l$ are obtained as shown in Fig. 19.

Figure 20:
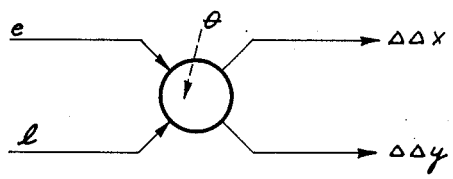

The resolver computations shown in Fig. 20 will obtain the coordinates $\Delta\Delta x$ and $\Delta\Delta y$.

By combining Figs. 16, 18, 19 and 20, the entire solution is presented in Fig. 21. In Fig. 21, with resolvers 27 and 28 set at the angle $\theta$ as shown, with resolvers 29 and 30 set at the angle $\varphi$, with $\Delta x$ and $\Delta y$ inputs to resolver 27 and with $\Delta z$ and $\Delta s$ inputs to resolver 29, resolvers 28 and 30 supplying the values $\Delta\Delta x$, $\Delta\Delta y$ and $\Delta\Delta z$.

The value $\Delta S'$ in the output of resolver 29 is used in the same manner as is $\Delta S$ in the two dimensional case. That is, where its value has decreased to a preselected value the error corrections start taking place. The three dimensional aspects of the unilateral system of Figs. 14 to 21 are described and claimed in Patent 2,843,811, patented July 15, 1958, by Robert W. Tripp and assigned to the present assignee.

According to the present invention, the equivalent bi-lateral resolver application will allow for the elimination of two resolvers of Fig. 21, as shown in Fig. 22. As shown in Fig. 22, resolvers 31 and 32 are set at the angles $\theta$ and $\phi$, respectively. The inputs $\Delta x$ and $\Delta z$ and the bridges B12 and B13 are in the input of resolver 31. The value $\Delta z$ and the bridge B14 are in one input to resolver 32, the other input being $\Delta s$ from resolver 31. Resolver 32 has one output $\Delta s'$, its winding which has the component $\Delta\Delta z'$ being shortcircuited to reflect and resolve the same into the values $\Delta\Delta z$ at bridge B14 and into the value $l$, the winding of resolver 31 having the component $e$ short circuited to reflect and resolve into the values $\Delta\Delta x$ at bridge B12 and $\Delta\Delta y$ at bridge B13. This explanation as to Fig. 22 applies also to the corresponding Fig. 23 wherein the bridges B12, B13 and B14 and the resolvers 31 and 32 are shown in further detail as illustrated and described in connection with Fig. 6.

Fig. 20 shows the resolver solution for the condition in Fig. 24, the inputs of $e$ and $l$ being resolved into the values $\Delta\Delta x$ and $\Delta\Delta y$ with transformation of coordinates at angle $\theta$. In this connection, note that on looking normal to the plane formed by $\Delta s'$ and $\Delta s$ in Fig. 14, $\Delta\Delta z$ is in the $\Delta s$, $\Delta s'$ plane and is parallel to $\Delta z$, while $l$ is in that same plane ($\Delta s$, $\Delta s'$) and is parallel to the $x$, $y$ plane. Since $e$ in Fig. 14 is normal to the $\Delta s$ and $\Delta s'$ plane, we can show Fig. 24 in the same plane as Fig. 15. From Fig. 24 and the corresponding Fig. 20, it is apparent that Fig. 20 is the resolver solution to Fig. 24.

Various other modifications may be made of the bi-lateral and short circuiting features of the present invention without departing from the spirit of the present claims.

I claim:

1. A bi-lateral electrical resolver system comprising a resolver having stator and rotor windings, a bridge having impedances in balanced relation and one of said impedances comprising one of said windings, an input for said bridge and for said one winding, said other winding serving as an output for said one winding for transmission in one direction with an input applied to said bridge whereby said one winding receives current by division with no potential drop at terminals across intermediate points of said bridge, and a separate input for said other winding and for which said bridge terminals serve as an output for transmission in the opposite direction.

2. A bi-lateral electrical resolver system comprising an electrical resolver having relatively rotatable inductively related windings, an input, a bridge having branches in parallel connected to said input, one of said branches having an arm comprising one of said resolver windings, said branches having impedances in balanced relation with no potential difference at terminals across intermediate points of said branches for said input, another input for said other resolver winding, said bridge terminals serving as an output for said other input.

3. A bi-lateral electrical resolver system comprising a resolver having inductively related windings which are relatively rotatable, one of said windings forming an arm of a balanced bridge, an input signal for said one winding and for said bridge, and another input signal for said other winding, said other winding serving as an output for said one winding, said bridge having an output for input to said other winding, said bridge output having zero potential difference for input signals applied to said one winding.

4. A bi-lateral electrical resolver system according to claim 2, another bridge having branches in parallel connected to said other input with said other winding forming an arm of one of said branches, said last mentioned branches having impedances in balanced relation and with no potential difference at terminals across intermediate points of its branches for an input applied to its associated said other winding.

5. A bi-lateral electrical resolver system comprising an electrical resolver having a plurality of relatively rotatable inductively related windings, an input for each of said windings, a bridge for each of said windings and its input, each of said windings forming an arm of its associated bridge, each of said bridges having branches in parallel with its associated input, each of said bridges having impedances in balanced relation and intermediate terminals, said terminals having no potential difference for the input applied to its bridge and said terminals serving as an output for the input applied to another of said windings.

6. A bi-lateral electrical resolver system comprising a four winding electrical resolver having two sets of crossed windings, one set being rotatable relatively to the other set, each of said windings forming an arm of a balanced bridge, a separate input signal for each of said windings and its bridge, each of said bridges having branches having impedances in balanced relation with no potential difference at terminals across intermediate points of its branches for the input applied in parallel to those branches, each of the inputs applied to the bridge of either winding of one set being operative to produce potential drop at the said intermediate terminals of both bridges of the other set.

7. A computing means comprising a resolver having a pair of stator windings at right angles to each other and a pair of rotor windings at right angles to each other, an input for each of the windings of one of said pairs in proportion to the coordinates of a signal in a first coordinate system, the windings of the other pair supplying components of such input in another coordinate system as determined by the rotary position of said rotor, a bridge in circuit with each of said inputs, each bridge having its associated winding and other impedances in branches in balanced relation and said bridge having intermediate branch terminals having no potential drop for its said input for transmission in one direction, a winding of said other pair being substantially short circuited to reflect its component in the opposite direction and for which said bridge terminals serve as outputs.

8. A computing means according to claim 7, said bridge terminals comprising an output of components in said first coordinate system of the component supplied by said short circuited winding.

9. A computing means according to claim 7, in combination with another resolver having a pair of stator windings at right angles to each other and a pair of rotor windings at right angles to each other, the other winding of said other pair of said first resolver serving as an input to one winding of one pair of said second resolver, and an input of a third coordinate for the other winding of said one pair of said other resolver and a bridge in circuit with said last mentioned winding, said last mentioned bridge having its associated winding and other impedances in balanced relation and having intermediate branch terminals having no potential drop for its said input for transmission in one direction, a winding of said other pair of said other resolver being short circuited to reflect its component in the opposite direction and for which said last mentioned bridge terminals serve as an output for a component thereof in said first mentioned coordinate system.

No references cited.